(12) United States Patent
Prescott

(10) Patent No.: US 9,440,777 B2
(45) Date of Patent: Sep. 13, 2016

(54) WHEEL HOLDER WITH MULTIPLE POSITION ADJUSTABLE STRAP

(71) Applicant: Thule Sweden AB, Hillerstorp (SE)

(72) Inventor: Keith L. Prescott, Cambridge, VT (US)

(73) Assignee: THULE SWEDEN AB, Hillerstorp (SE)

( * ) Notice: Subject to any disclaimer, the term of this patent is extended or adjusted under 35 U.S.C. 154(b) by 0 days.

(21) Appl. No.: 14/285,051

(22) Filed: May 22, 2014

(65) Prior Publication Data

US 2015/0026935 A1  Jan. 29, 2015

Related U.S. Application Data

(60) Provisional application No. 61/859,047, filed on Jul. 26, 2013.

(51) Int. Cl.
*B60R 9/10* (2006.01)
*B65D 63/16* (2006.01)
*B60R 9/048* (2006.01)

(52) U.S. Cl.
CPC .............. *B65D 63/16* (2013.01); *B60R 9/048* (2013.01); *B60R 9/10* (2013.01); *Y10T 24/45246* (2015.01)

(58) Field of Classification Search
CPC ........... B60R 9/00; B60R 9/10; B60R 9/048; B60R 9/08; B65D 63/16; Y10T 24/45246
USPC ................. 248/229.17, 228.8; 403/320, 315; 224/324, 924, 315, 322, 537, 325, 567, 224/568, 571, 572; 211/17, 20
See application file for complete search history.

(56) References Cited

U.S. PATENT DOCUMENTS

| | | | | |
|---|---|---|---|---|
| 4,174,119 A | * | 11/1979 | Biles | 410/103 |
| 5,165,815 A | * | 11/1992 | Allen | 403/24 |
| 5,435,472 A | * | 7/1995 | Allen et al. | 224/493 |
| 5,570,825 A | * | 11/1996 | Cona | 224/495 |
| 5,598,960 A | * | 2/1997 | Allen et al. | 224/324 |
| 6,431,423 B1 | | 8/2002 | Allen et al. | |
| 6,513,691 B1 | * | 2/2003 | Edgerly | 224/537 |
| 6,561,398 B1 | * | 5/2003 | Cole et al. | 224/324 |
| 6,761,297 B1 | * | 7/2004 | Pedrini | 224/519 |
| 7,234,617 B2 | * | 6/2007 | Weaver et al. | 224/324 |
| 7,726,528 B2 | | 6/2010 | Foley | |
| 7,726,529 B2 | | 6/2010 | Foley | |
| 8,348,113 B2 | * | 1/2013 | Huang | 224/567 |
| 2011/0132946 A1 | * | 6/2011 | Sautter et al. | 224/324 |
| 2012/0277682 A1 | | 11/2012 | Corato et al. | |
| 2013/0193175 A1 | * | 8/2013 | Ward et al. | 224/309 |

* cited by examiner

*Primary Examiner* — Nkeisha Smith
(74) *Attorney, Agent, or Firm* — Sterne, Kessler, Goldstein & Fox, P.L.L.C.

(57) ABSTRACT

A bicycle wheel anchor for securing differently sized bicycle wheels onto a load carrier is disclosed. A bicycle wheel anchor can include a bicycle wheel receiver configured to accept bicycle wheels of different sizes. The anchor can include an elongate wheel securement strap having a tongue portion which is spaced apart from a tail portion located on an opposite side of an intermediate extension portion of the strap. The tail portion of the strap can comprise a catch to be anchored at different locations on the anchor in a plurality of variously located catch-trap. The anchor can include a first catch-trap positioned a distance away from a second catch-trap, such that a different length of the strap is available for extension about the wheel receiver in a first installed configuration than in a second installed configuration.

20 Claims, 9 Drawing Sheets

WHEEL HOLDER WITH MULTIPLE POSITION ADJUSTABLE STRAP

CROSS-REFERENCE TO RELATED APPLICATION

This application claims priority to U.S. Provisional Application No. 61/859,047, filed Jul. 26, 2013, the contents of which are entirely incorporated by reference herein.

FIELD

The subject matter herein generally relates to vehicle borne bicycle carriers. In particular the subject matter herein relates to bicycle wheel securement devices.

BACKGROUND

Vehicle racks can be load bearing frame-like structures installable on the beds of pick-up trucks for carrying various articles thereon. These frame-like structures can be configured to receive wheel securement devices.

BRIEF DESCRIPTION OF THE DRAWINGS

Implementations of the present technology will now be described, by way of example only, with reference to the attached figures, in which.

DETAILED DESCRIPTION

Figure 1:
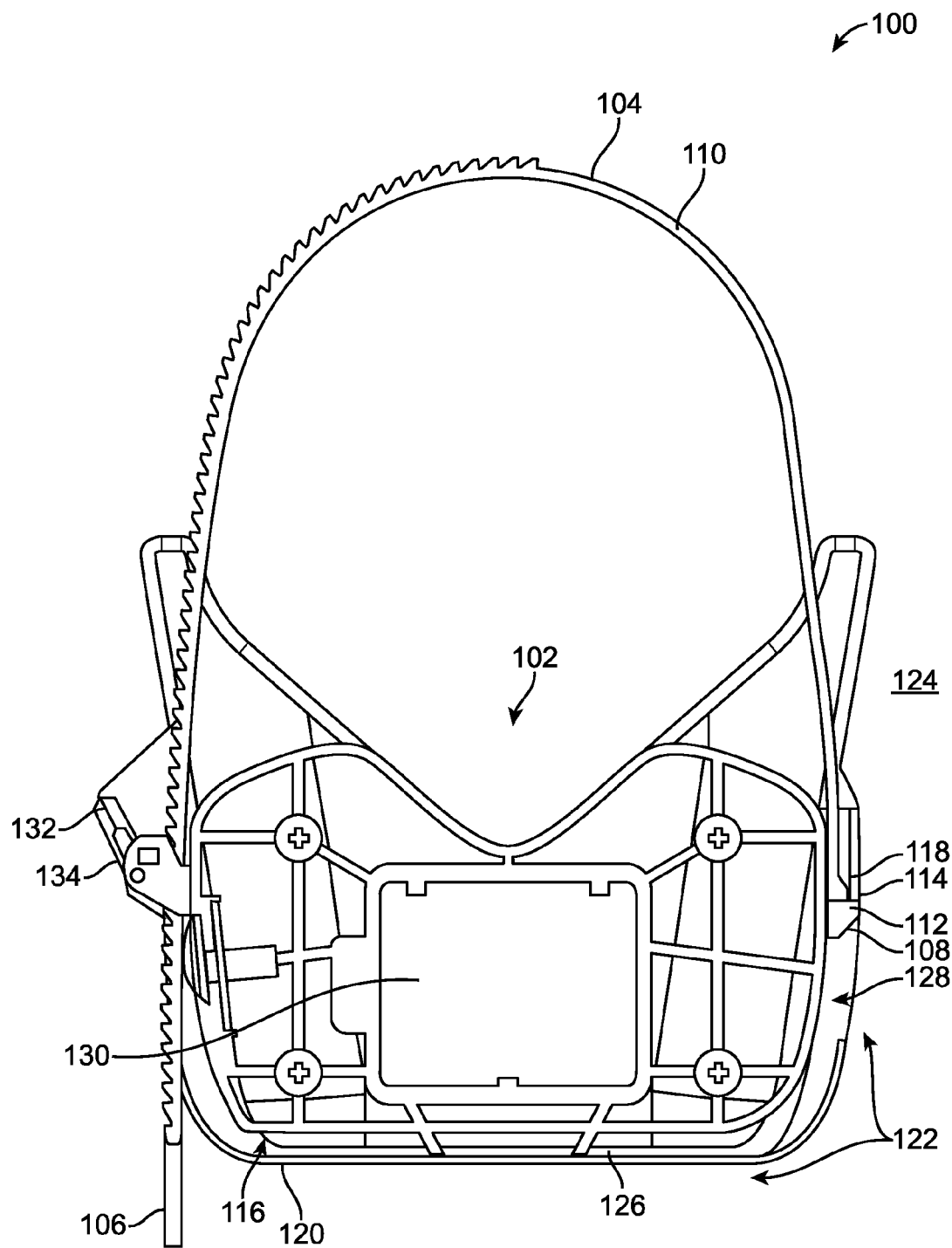
FIG. 1 illustrates an internal side view of a bicycle wheel anchor for securing differently sized bicycle wheels on a load carrier.

For simplicity and clarity of illustration, where appropriate, reference numerals have been repeated among the different figures to indicate corresponding or analogous elements. In addition, numerous specific details are set forth in order to provide a thorough understanding of the implementations described herein. However, the implementations described herein can be practiced without these specific details. In other instances, methods, procedures and components have not been described in detail so as not to obscure the related relevant feature being described. Also, the description is not to be considered as limiting the scope of the implementations and embodiments described herein.

The present disclosure concerns various components that can be implemented and utilized to anchor or secure bicycle wheels of different sizes onto load carriers. Load carriers can include, but are not limited to, load carriers which are mountable onto vehicles such as cars and trucks. At least one way that bicycles can vary in size is that their tires can vary in width and diameter. While the illustrated examples are provided in relation to a bicycle wheel anchor, certain components can be implemented with other devices.

In at least one example embodiment of a bicycle wheel anchor for securing differently sized bicycle wheels on a load carrier, the bicycle wheel anchor can comprise a bicycle wheel receiver configured to accept bicycle wheels of different sizes and an elongate wheel securement strap having a tongue portion spaced apart from a tail portion that is located on an opposite side of an intermediate extension portion of the strap. The tail portion can include at least one catch configured to be anchored at different locations on the bicycle wheel anchor in a plurality of variously located catch-traps on the bicycle wheel anchor. The bicycle wheel anchor can also comprise a first catch-trap positioned a distance away from a second catch-trap so that a different length of the strap is available for extension about the wheel receiver in a first installed configuration of the strap in which the catch of the tail portion of the strap is anchored in the first catch-trap than in a second installed configuration of the strap in which the catch of the tail portion of the strap is anchored in the second catch-trap. Additional numbers of catches and catch straps can also be implemented within this disclosure. The bicycle wheel anchor can also comprise an elongate track circumscribing at least a portion of the bicycle wheel anchor and the track can receive therein at least a portion of the securement strap in at least one of the first and second installed configurations of the strap.

In at least one embodiment of the anchor, the second catch-trap can be located closer to the wheel receiver than the first catch-trap. The spacing between these components can be varied.

In at least one embodiment, a greater length of the strap can be made available for extension about or around the wheel receiver in the first installed configuration of the strap than in the second installed configuration of the strap.

In at least one embodiment, the track can comprise an elongate recess into the bicycle wheel anchor. In at least one embodiment, the track can be configured to position the securement strap about the anchor in at least one of the first and second installed configurations of the strap. Furthermore, the first and second catch-traps can be placed or positioned at different locations along a length of the track.

In at least one embodiment, a portion of the track can be enclosed so as to form a tunnel within the bicycle wheel anchor. The tunnel thus formed can contain a portion of the strap in at least one of the first and second installed configurations of the strap.

In at least one embodiment, at least one of the first or second catch-traps can be located on a lower portion of the wheel anchor. In at least one embodiment, both the first and second catch-traps can be located or positioned or placed on the wheel anchor at a position lower than the bicycle wheel receiver.

At least one embodiment of the bicycle wheel anchor apparatus can include a rail aperture through the lower portion of the wheel anchor configured to receive a support rail of a bicycle carrier. The size of the aperture can be different in different embodiments. In at least one embodiment, a portion of the securement strap can be positioned beneath the rail aperture in the first installed configuration of the strap. In at least one embodiment, a portion of the securement strap can be positioned beneath the rail aperture in the second installed configuration of the strap. A portion of the securement strap can be positioned beneath the rail aperture in other installed configurations of the securement strap. In at least one embodiment, the first catch-trap can be located lower on the anchor body than the rail aperture.

In at least one embodiment, the bicycle wheel anchor can also comprise an elongate track which circumscribes at least a portion of the bicycle wheel anchor. At least a portion of the securement strap can be received within the track in at least one of the first and second installed configurations of the strap. At least a portion of the track can be positioned lower than the rail aperture. In at least one embodiment, at least a portion of the track can be positioned beneath the rail aperture.

In at least one embodiment, the bicycle wheel anchor can also comprise a releasable strap fastener which is located adjacent to the bicycle wheel support. In at least one embodiment, the strap fastener can comprise a buckle. In at least one embodiment the strap fastener can comprise a lever, which can be adjustable, and the strap can comprise a series of projections such as ridges, grooves, teeth or bumps, or combination thereof. The lever can be actuable to engage different ones of the projections for fixing the strap at different positions relative to the fastener.

At least embodiment within this disclosure is a bicycle wheel anchor for securing differently sized bicycle wheels onto a load carrier. The bicycle wheel anchor can comprise a bicycle wheel receiver which is configured to accept or receive bicycle wheels (or tires) of disparate sizes. In at least one embodiment, the anchor can also comprise an elongate wheel securement strap having a tongue portion spaced apart from a tail portion that is located on an opposite side of an intermediate extension portion of the strap and an elongate track circumscribing at least a portion of the bicycle wheel anchor. The track can receive therein at least a portion of the securement strap. In at least one embodiment, the anchor can also comprise a pump-buckle that can retract the strap relative to the bicycle wheel receiver into the elongate track, such that a different length of the strap can be made available for extension about the wheel receiver in a first secured configuration of the strap in which the tail portion of the strap is anchored in the pump-buckle at a first location along a length of the strap than in a second secured configuration of the strap. In the second secured configuration of the securement strap the tail portion of the strap can be anchored in the pump-buckle at a second location along a length of the strap.

In at least one embodiment, the securement strap can comprise a series of engagement locations along the length of the strap and the pump-buckle has a pawl for serially engaging the engagement locations upon actuation of the pump-buckle and thereby retracting the strap into the elongate track. The engagement locations can be formed by ridges, grooves, teeth or bumps, or a combination thereof, on the surface of the strap facing the pump-buckle. The pump-buck can include a ratcheting mechanism. As noted above, the track can be partially or wholly enclosed, thereby forming a tunnel within the bicycle wheel anchor that can contains portion of the securement strap in at least one of the first and second installed configurations of the strap.

FIG. 1 illustrates an internal side view of a bicycle wheel anchor 100 for securing differently sized bicycle wheels on a load carrier (not shown). A strap 104, as will be discussed below, is shown in a first installed configuration 124. The bicycle wheel anchor 100 includes a bicycle wheel receiver 102 configured to accept bicycle wheels of different sizes. The tire of a bicycle wheel (not shown) can be placed on or within the wheel receiver 102. The wheel anchor 100 also includes an elongate wheel securement strap 104 for securing a bicycle wheel to the receiver 102. As shown, the strap 104 can have a tongue portion 106 spaced apart from a tail portion 108 that is located on an opposite side of an intermediate extension portion 110 of the strap 104. The strap 104 can be held in place within the anchor 100 at its tail portion 108. The tail portion 108 can comprise a raised catch 112 which enables the tail portion 108 to be anchored at different locations 114, 116 on the bicycle wheel anchor 100 in a plurality of variously located catch-traps 118, 120 on the bicycle wheel anchor 100. The catch 112 can be angled on one side and orthogonal to the strap 104 to allow the tail portion 108 to pass through the catch-traps in one direction only. In the embodiment illustrated in FIG. 1, a first catch-trap 118 is positioned a distance 122 away from a second catch-trap 120 so that a different length of the strap 104 is available for extension about the wheel receiver 102 in a first installed configuration 124 of the strap 104 in which the catch 112 of the tail portion 108 of the strap 104 is anchored in the first catch-trap 118 than in a second installed configuration 200 of the strap 104 in which the catch 112 of the tail portion 108 of the strap 104 is anchored in the second catch-trap 120, which can enable the anchor 100 to receive and secure a greater variation of tire diameters than would otherwise be the case, (see FIG. 2, discussed below).

In the embodiment illustrated in FIG. 1, the second catch-trap 120 of the bicycle wheel anchor 100 is located closer to the wheel receiver 102 than is the first catch-trap 118. Other configurations and placements of the catch-traps 118, 120 are possible within this disclosure. Additionally, a greater number of catch-traps can be included in the anchor 100 within this disclosure. As indicated in the preceding paragraph, FIG. 1 illustrates the securement strap 104 in a first installed configuration in which a greater length of the strap 104 is available for extension about the wheel receiver 102 (and a bicycle wheel) because the strap (104) is secured at catch-trap 118 rather than at the second catch-trap 120.

As illustrated in FIG. 1, the bicycle wheel anchor 100 can include an elongate track 126 which runs around at least a portion of the bicycle wheel anchor 100. At least a portion of the strap 104 can be received by and reside within the track 126 in at least one of the first and second installed configurations 124, 200 of the strap 104. The track 126 can incorporate an elongate recess 128 into the bicycle wheel anchor 100. The recess 128 can be wholly or partially enclosed.

In the embodiment illustrated in FIG. 1, the track 126 positions the securement strap 104 in a first installed configuration 124. In the first installed configuration illustrated, the strap 104 is secured at location 114 and a greater amount of the strap 104 is available to secure a bicycle wheel/tire than if the strap 104 is secured at location 116. The strap 104 is secured at location 114 at a first catch-trap 118. The track 126 is enclosed and forms a tunnel within the bicycle wheel anchor 100 which can contain a portion of the strap. In this embodiment, a second catch-trap 120 is located on a lower portion of the wheel anchor 100 than the first catch-trap 118. In FIG. 1, the first and second catch-traps 118,120 are located on the wheel anchor 100 at a position lower than the bicycle wheel receiver 102. These catch-traps 118,120 can be positioned in other locations. Furthermore, the anchor 100 can include more or fewer catch-traps than the two 118,120 illustrated.

The embodiment of the anchor 100 illustrated in FIG. 1 also includes a rail aperture 130 which runs through the lower portion of the wheel anchor 100. The rail aperture 130 can be configured to receive a support rail of a bicycle carrier. Although the rail aperture 130 illustrated is square-shaped, other shapes are possible within this disclosure.

Figure 2:
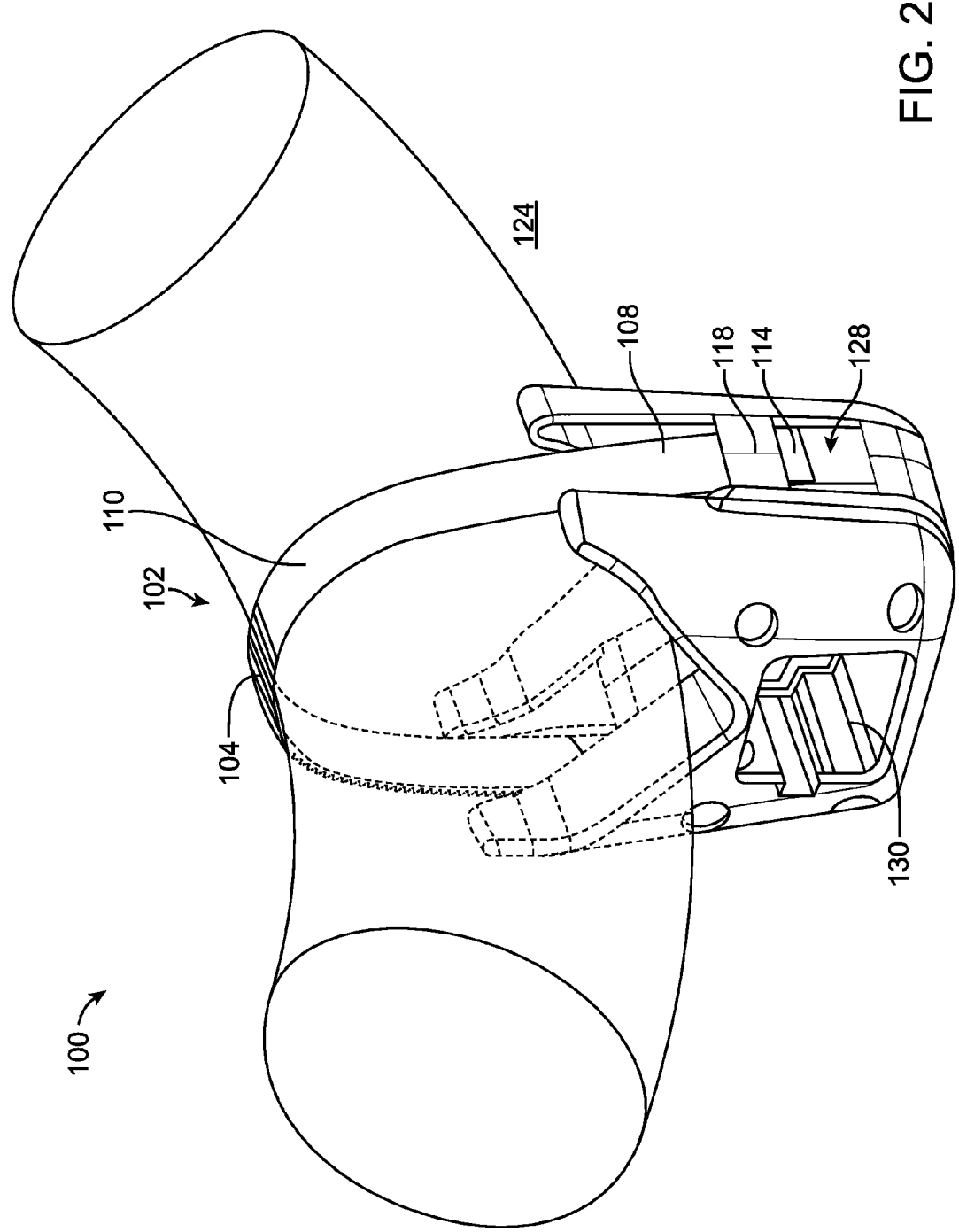
FIG. 2 illustrates a perspective view of a wheel anchor in which a first-catch trap is visible.

FIG. 2 illustrates a perspective view of a wheel anchor 100 in which a first-catch trap 118 is visible. A large wheel is shown secured to the anchor 100. The wheel is positioned in wheel receiver 102 and secured by the securement strap 104. The strap 104 is in the first installed configuration 124. The tail portion 108 of the strap 104 is secured at a first location 114 at the first catch-trap 118. An elongate recess 128 is formed in the lower portion of the anchor 100. The recess 128 is connected to the track 126 (not visible) which runs through the anchor 100 and can be configured to receive the securement strap therein. (See FIG. 1.) The securement strap 104 has an intermediate portion 110 which is located between a tongue portion (not shown) of the strap 104 and the tail portion of the strap 108. As was the case with FIG. 1 the anchor 100 illustrated in FIG. 2 includes a rail aperture 130 which runs through the lower portion of the wheel anchor 100.

Figure 3:
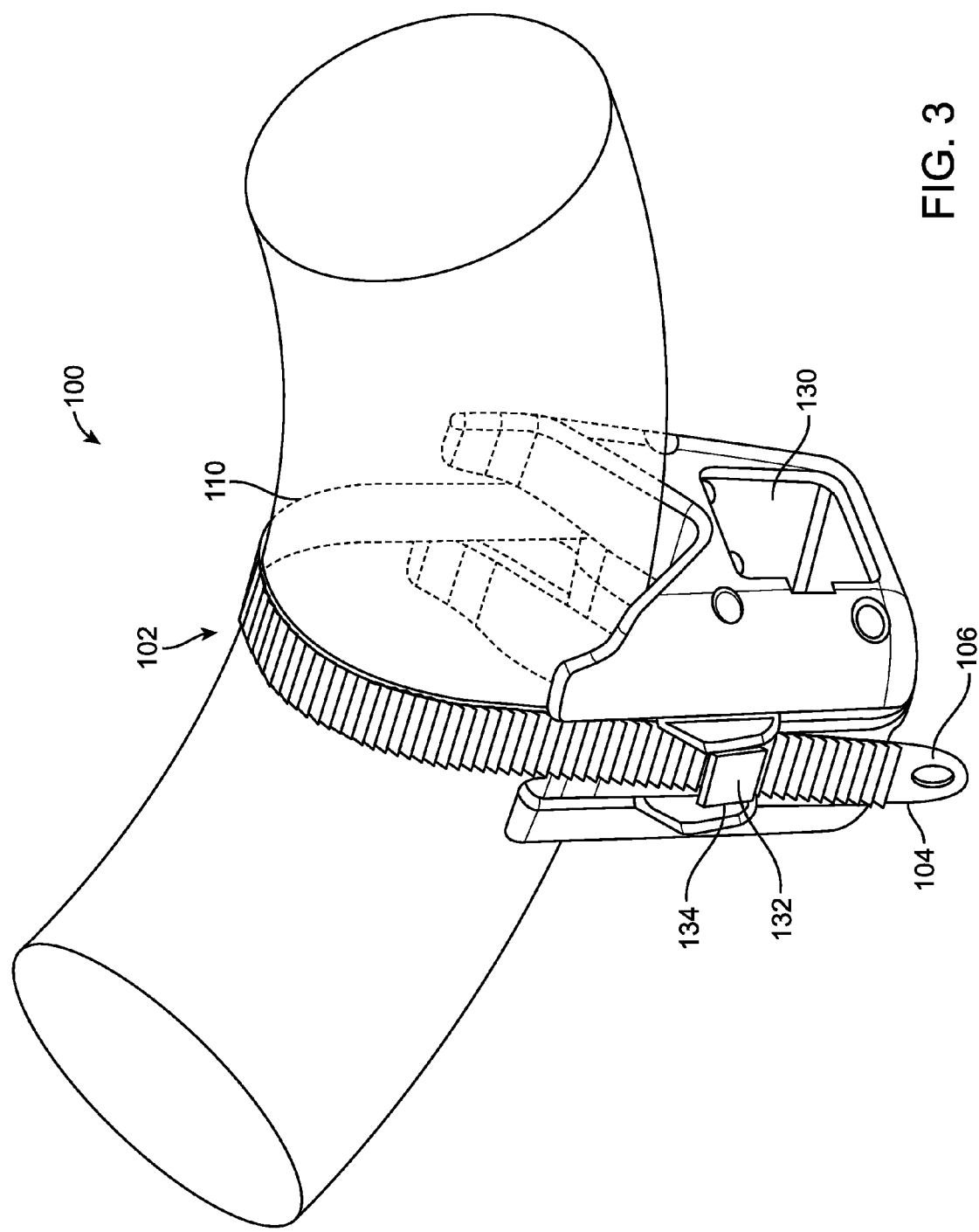
FIG. 3 illustrates a perspective view of a wheel anchor in which a releasable fastener is visible.

FIG. 3 illustrates a perspective view of a wheel anchor 100 in which a releasable fastener 132 is visible. In the embodiment shown in FIG. 3, the releasable fastener comprises a lever 134. The releasable fastener 132 can be configured to receive a leading tongue portion 106 of a securement strap 104 and thereafter releasably press against a portion of the securement strap 104 which is between the fastener 132 and a side of the anchor 100. The securement strap 104 has an intermediate portion 110 which is located between the tongue portion 106 of the strap 104 and the tail portion of the strap, (not shown). As in FIG. 2, the bicycle wheel is shown under the intermediate portion 110 and above the wheel receiver 102 and the anchor 100 includes a rail aperture 130 beneath the wheel receiver.

Figure 4:
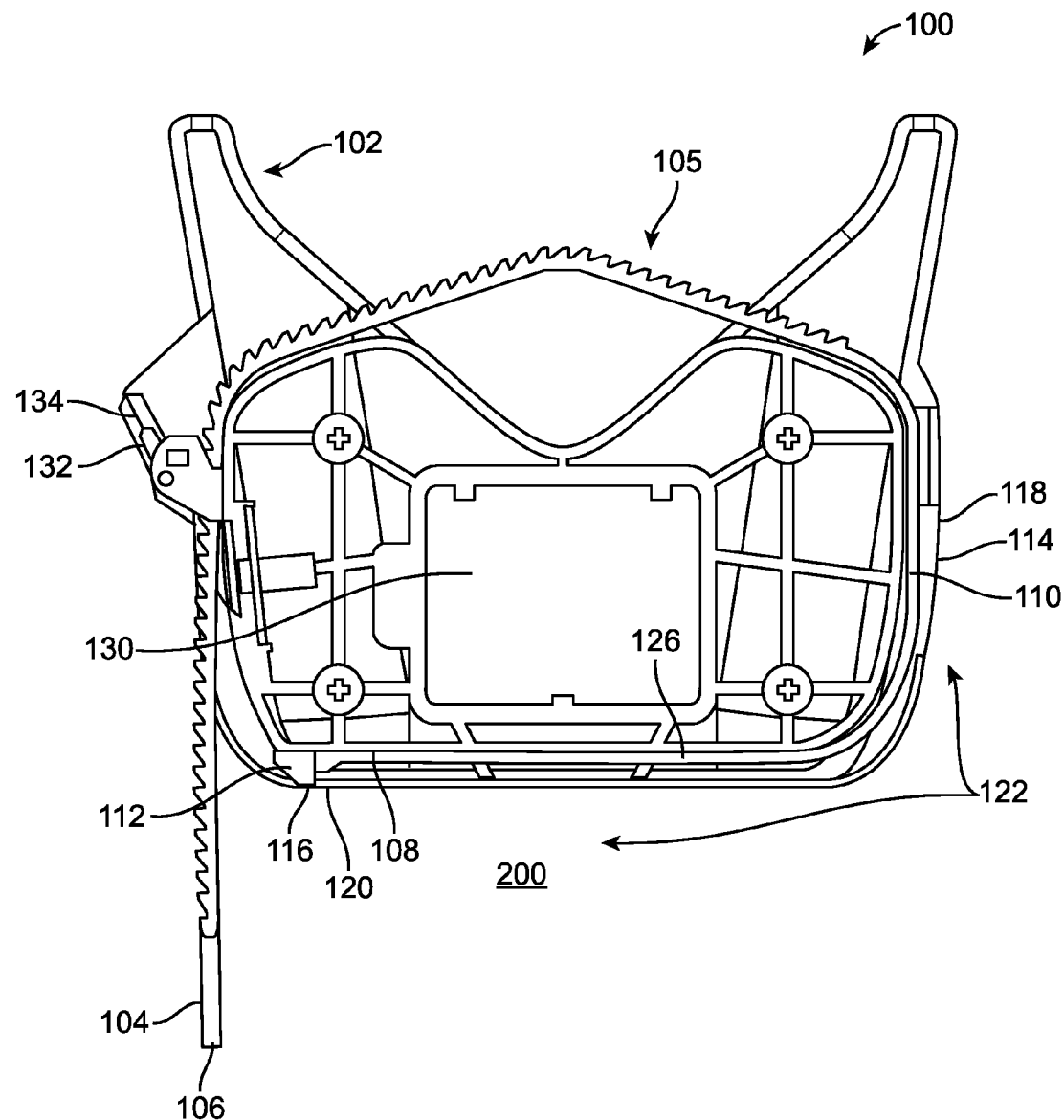
FIG. 4 illustrates an internal side view of a bicycle wheel anchor for releasably securing differently sized bicycle wheels onto a load carrier.

FIG. 4 illustrates an internal side view of a bicycle wheel anchor 100 for releasably securing differently sized bicycle wheels onto a load carrier (not shown). The securement strap 104 is shown in a second installed configuration 200. As discussed above, the bicycle wheel anchor 100 includes a bicycle wheel receiver 102 configured to accept bicycle wheels of different sizes. The elongate wheel securement strap 104 can be configured to secure a bicycle wheel to the receiver 102. As shown, the strap 104 can include a tongue portion 106 spaced apart from a tail portion 108 that is located on an opposite side of an intermediate extension portion 110 of the strap 104. The strap 104 can be held in place within the anchor 100 at its tail portion 108. The tail portion 108 can comprise a raised catch 112 which enables the tail portion 108 to be anchored at different locations 114, 116 on the bicycle wheel anchor 100 in a plurality of variously located catch-traps 118, 120 on the bicycle wheel anchor 100. In the embodiment illustrated in FIG. 4, the catch 112 is located at location 116 where it is caught by catch-trap 120. As illustrated, the catch 112 can is angled on one side and substantially orthogonal to the strap 104 on the other side. The substantially orthogonal side is shown caught on catch-trap 120 at position 116. As was the case with embodiments illustrated in FIGS. 1-3, the first catch-trap 118 is positioned a distance 122 away from the second catch-trap 120 so that a different length of the strap 104 can be made available for extension about the wheel receiver 102 in a first installed configuration (not shown) of the strap 104 in which the catch 112 of the tail portion 108 of the strap 104 is anchored in the first catch-trap 118 than in the second installed configuration 200 of the strap 104 in which the catch 112 of the tail portion 108 of the strap 104 is anchored in the second catch-trap 120. As noted above, this arrangement of catch-traps 118,120 can enable the anchor 100 to receive and secure a greater variation of tire diameters than would be the case if only one catch-trap were included in the anchor 100. As indicated above, additional catch traps can be included in the anchor 100 to provide additional positions to secure the tail portion 108 of the strap 104.

In FIG. 4, a portion of the securement strap 104 is positioned beneath the rail aperture 130 in the second installed configuration 200 of the strap 104. As illustrated, the second catch-trap 120 is located lower on the body of the anchor 100 than is the rail aperture 130. The anchor 100 includes an elongate track 126 which runs around a portion of the anchor 100. Received within the track 126 is a length of the securement strap 104. A portion of the track 126 is located on the side of rail aperture 130 and extends below the rail aperture 130. A portion of the track 126 is located to the side of the rail aperture 130. As shown, a releasable strap fastener 132 can be located substantially adjacent to the bicycle wheel receiver 102. The releasable strap fastener 132 can comprise one or more buckles (not shown).

In the embodiment of the anchor 100 shown in FIG. 4, the strap fastener 132 comprises a lever 134 and the strap 104 comprises a series of projections 105. The lever 134 can be configured to be actuable to engage different ones of the projections for fixing the strap 104 at different positions relative the fastener 132.

Figure 5:
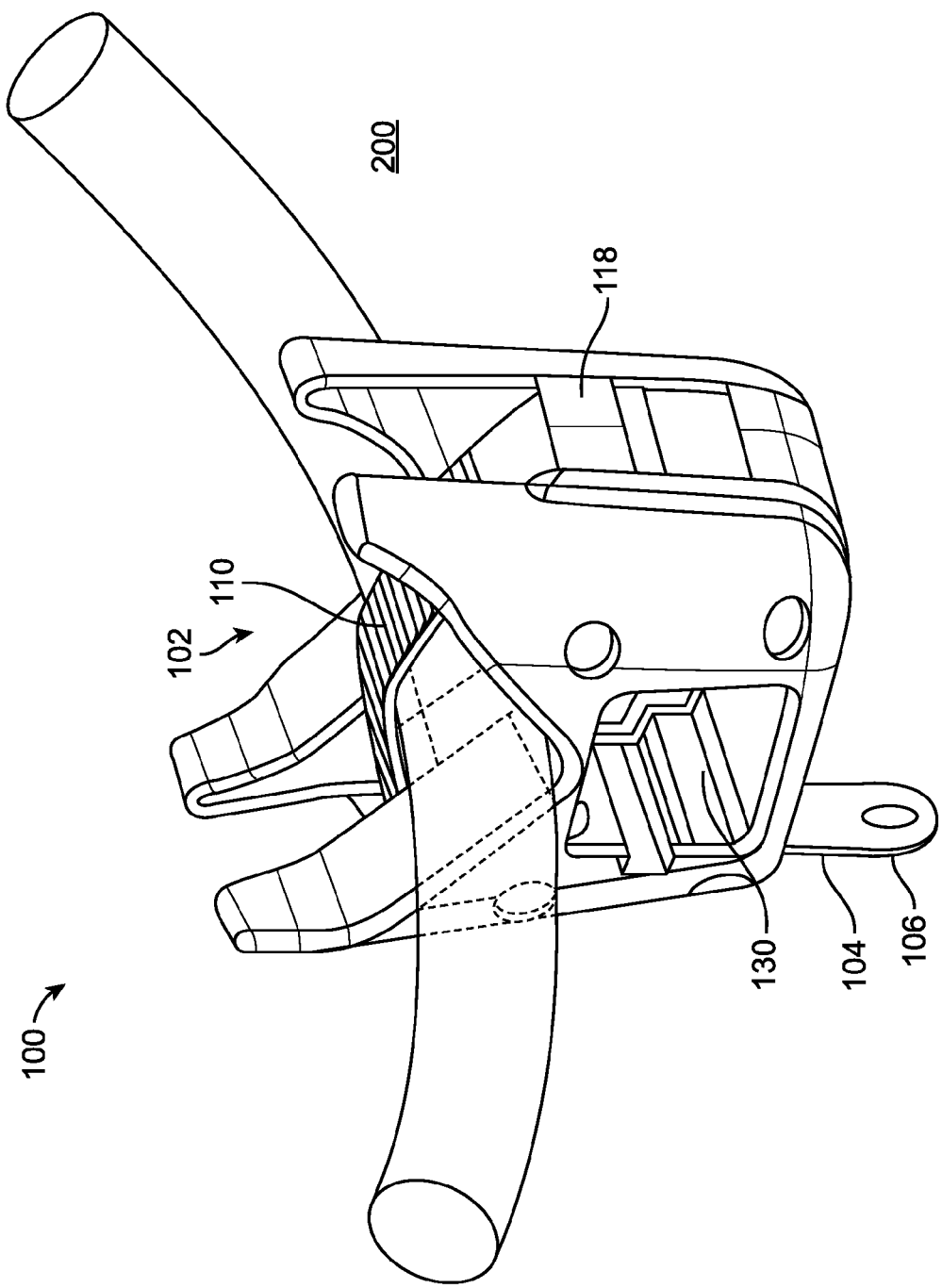
FIG. 5 illustrates a perspective view of a bicycle wheel anchor for releasably securing differently sized bicycle wheels onto a load carrier in which the first catch-trap can be seen.

FIG. 5 illustrates a perspective view of a bicycle wheel anchor 100 for releasably securing differently sized bicycle wheels onto a load carrier, in which the first catch-trap 118 can be seen. The securement strap 104 is shown in a second installed configuration 200. The elongate wheel securement strap 104 is shown securing a wheel to the receiver 102. As above, the strap 104 includes a tongue portion (not shown) which is spaced apart from a tail portion (not shown) which is located on the opposite side of the intermediate extension portion 110 of the strap 104. The extension portion 110 extends around a wheel in FIG. 5, whereby the wheel is secured to the anchor 100 within the wheel receiver 102. The first catch-trap 118 is positioned a distance away from the second catch-trap (not shown) so that a different length of the strap 104 can be made available for extension about the wheel receiver 102 in a first installed configuration (not shown) of the strap 104. As illustrated in FIG. 5, in the second installed configuration 200 of the strap 104, the catch (not shown) of the tail portion (not shown) of the strap 104 is anchored in the second catch-trap (not shown).

In FIG. 5, a substantial portion of the securement strap 104 is positioned beneath the rail aperture 130, though this substantial portion is not visible because it is internal to the anchor 100. The second catch-trap (not shown) is located lower on the body of the anchor 100 than is the rail aperture 130. The anchor 100 includes an elongate track 126 which runs around a portion of the anchor 100 and partially encircles the rail aperture 130. Most of the elongate track is not visible in FIG. 5 because it is located inside the body of the anchor 100. A length of the securement strap 104 resides within the track 126. As indicated with reference to FIG. 4, a portion of the track 126 is positioned lower than the rail aperture 130, while another portion of the track 126 is located to the side of the rail aperture 130. The releasable strap fastener discussed with regard to FIG. 4 is not visible in FIG. 5.

Figure 6:
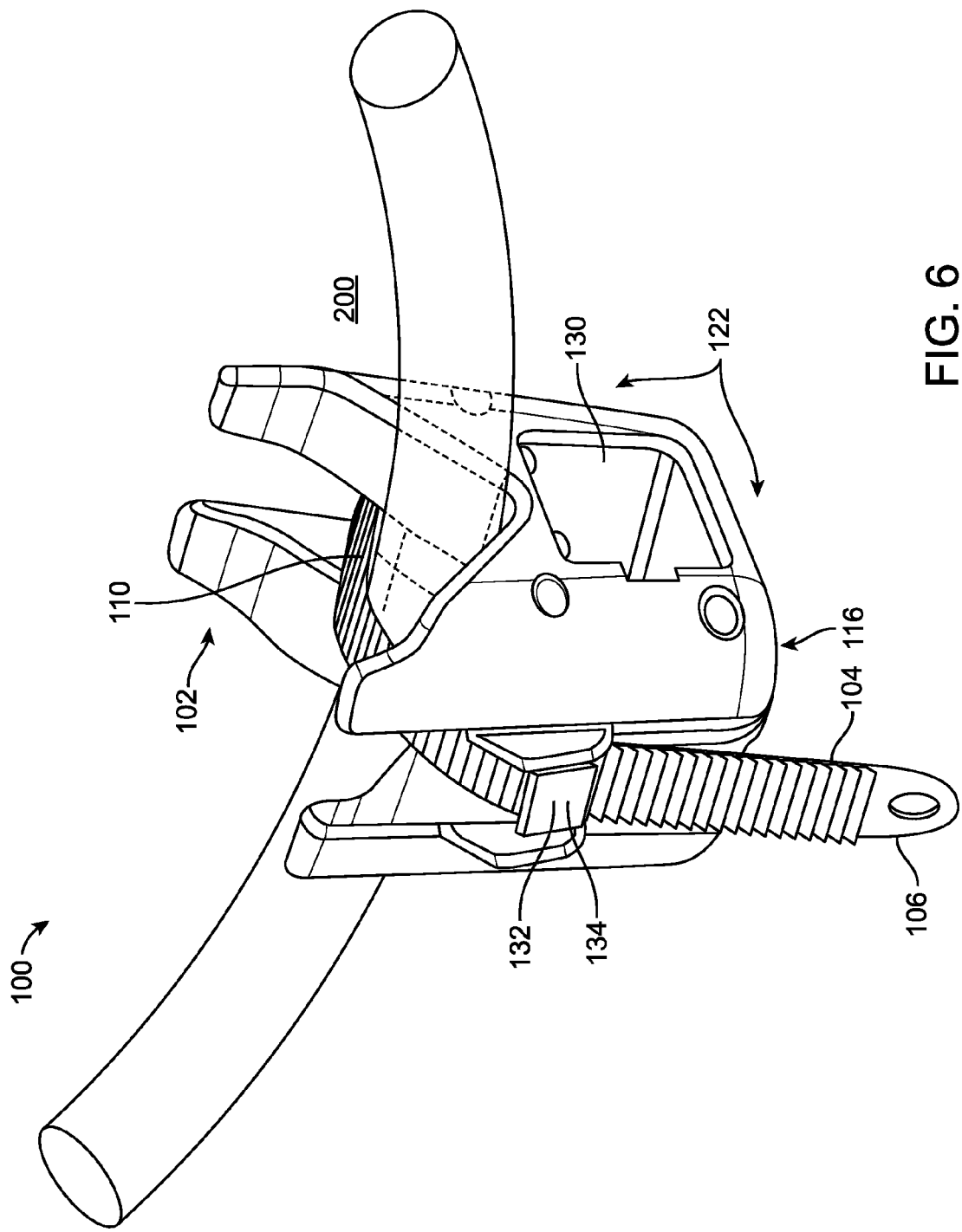
FIG. 6 illustrates a perspective view of a bicycle wheel anchor in which the securement strap is in a second installed configuration.

FIG. 6 illustrates a perspective view of a bicycle wheel anchor 100 in which the securement strap 104 is shown in a second installed configuration 200. The bicycle wheel anchor 100 includes a bicycle wheel receiver 102 configured to accept bicycle wheels of different sizes. The elongate wheel securement strap 104 is shown securing a smaller bicycle wheel to the receiver 102. As shown in FIG. 6, the strap 104 can include a tongue portion 106 spaced apart from a tail portion (not shown) of the strap 104. An intermediate portion 110 is between the tongue 106 and the tail. Again, the strap 104 can be held in place within the anchor 100 at its tail portion. In the embodiment illustrated in FIG. 6, the catch 112 is located at location 116 where it is caught by the second catch-trap (not visible). Again, the first catch-trap (not visible) is positioned a distance 122 away from the second catch-trap, such that different lengths of the strap 104 can be made available for extension about the wheel receiver 102. As noted above, this arrangement of catch-traps can enable the anchor 100 to receive and secure a wider variation of tire diameters than would be the case if only one catch-trap were provided. Again, and as indicated above, additional catch traps can be included in the anchor 100 to provide additional positions to secure the tail portion of the strap 104 to the body of the anchor 100.

In FIG. 6, a releasable strap fastener 132 can be seen located substantially adjacent to the bicycle wheel receiver 102. The releasable strap fastener 132 can comprise one or more buckles (not shown). In the embodiment of the anchor 100 shown in FIG. 6, the strap fastener 132 comprises a lever 134, while the strap 104 comprises a series of projections 105. The projections can be teeth or a series of pectinate areas or bumps or ridges or grooves. The lever 134 can be configured to be actuable to engage different ones of the projections for fixing the strap 104 at different positions relative the fastener 132. The lever 134 can be depressed to allow the strap 104 to be withdrawn from beneath the lever 134, thereby releasing a wheel from the wheel receiver 102.

Figure 7:
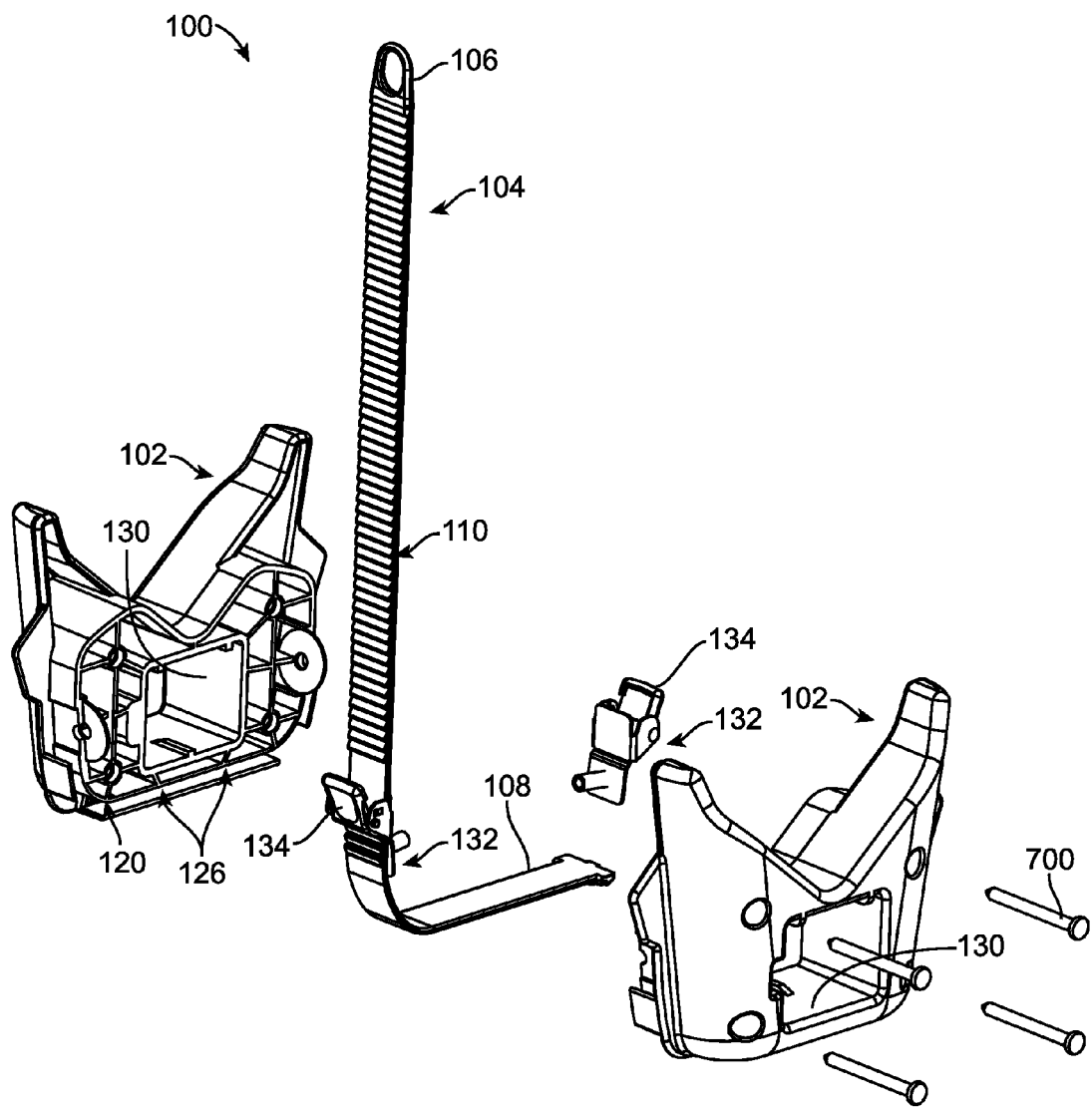
FIG. 7 illustrates an exploded view of the wheel anchor.

FIG. 7 illustrates an exploded view of the wheel anchor 100. The track 126 formed around the wheel aperture 130 is visible. The second catch-trap 120 at the mouth of the track 120 is visible. Bolts or screws 700 for securing one part of the anchor body 100 to the other can be seen. The tongue 106, the intermediate portion 110 and the tail 108 of the securement strap 104 are visible. A portion of the strap 104 is parallel to the track 126. Also visible is the fastener 132, which comprises a lever 134 for releasably securing the strap 104 to the anchor 100 as discussed above.

Figure 8:
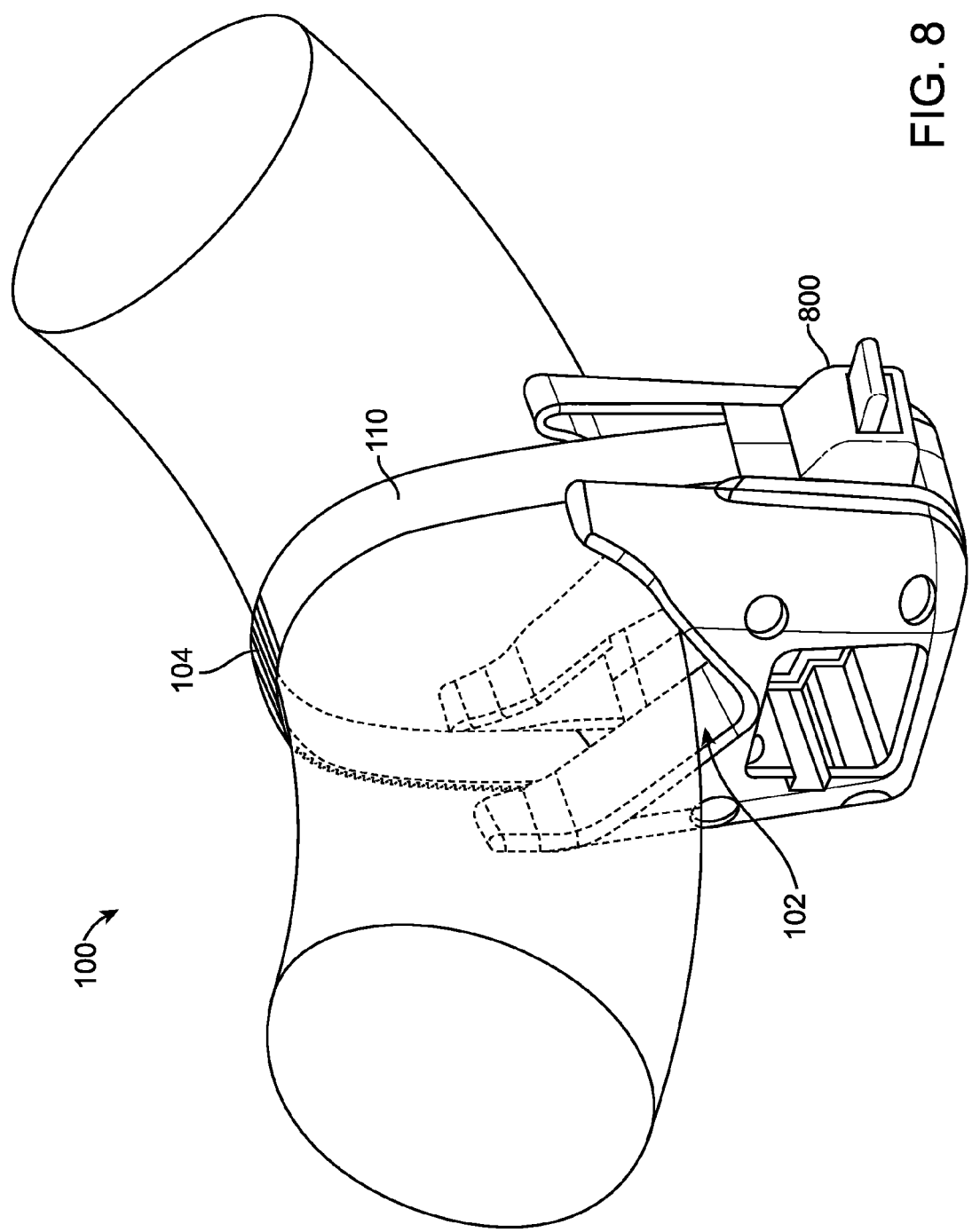
FIG. 8 illustrates an embodiment of a bicycle wheel anchor comprising a pump-buckle for securing differently sized bicycle tires to a load carrier.

FIG. 8 illustrates another embodiment of a bicycle wheel anchor 100 for securing differently sized bicycle tires to a load carrier. The anchor 100 includes a wheel receiver 102 shaped and arranged to accept bicycle wheels of different sizes and diameters. The anchor 100 includes an elongate wheel securement strap 104 with a tongue portion (not shown) spaced apart from a tail portion (not shown). In between these portions is an intermediate extension portion 110. The embodiment shown in FIG. 8 includes a pump-buckle 800 that can retract the strap 104 relative to the bicycle wheel receiver 102 into the elongate track (not shown) so that a different length of the strap 104 can be available for extension about the bicycle wheel receiver 102.

Figure 9:
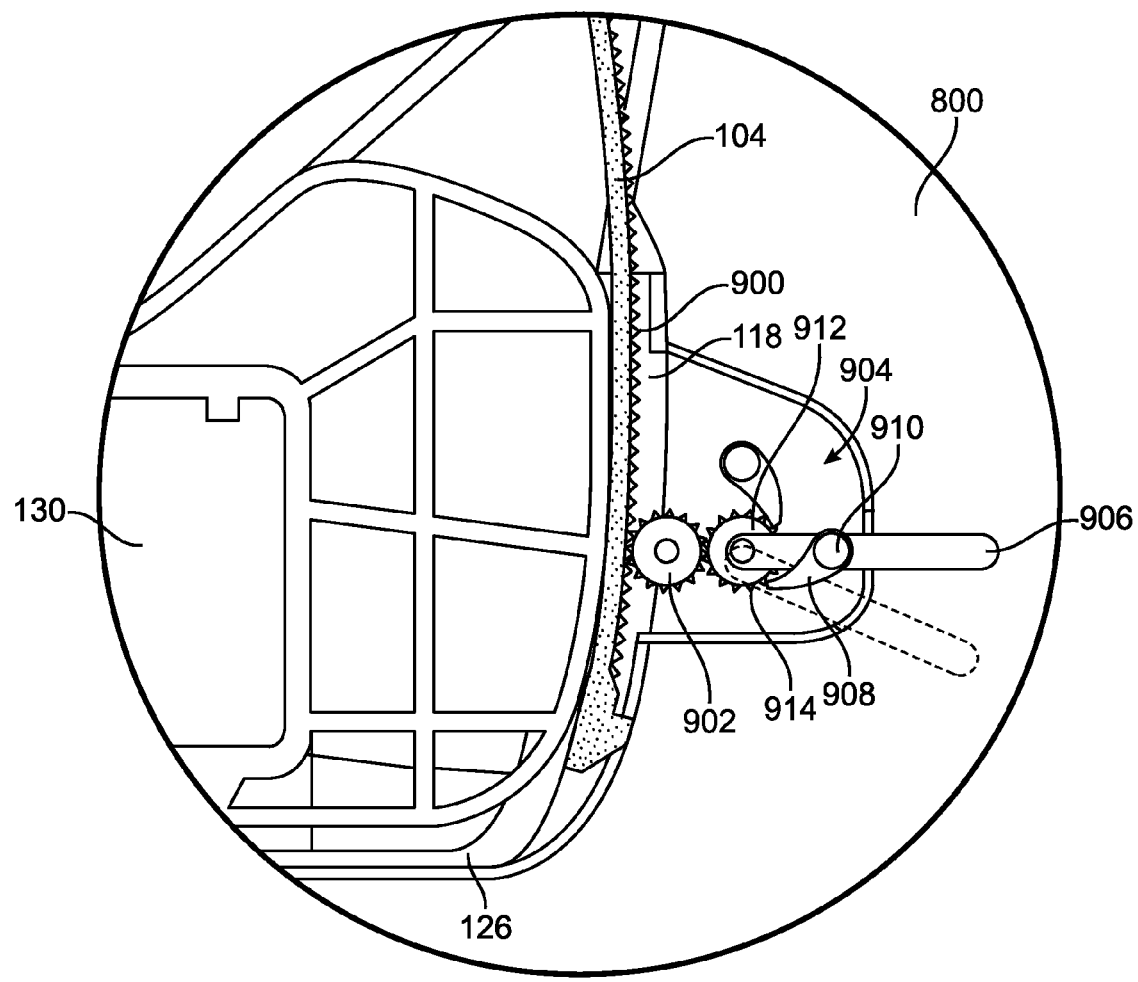
FIG. 9 illustrates a detailed internal view of the pump-buckle mechanism of FIG. 8.

FIG. 9 illustrates a detailed internal view of the pump-buckle mechanism 800. The area of the strap 104 shown comprises a series of engagement locations 900. The pump-buckle 800 includes a first toothed wheel 902 for serially engaging the engagement locations upon actuation of the pump-buckle 900 and thereby retracting the strap 104 into the elongate track 126. The toothed wheel 902 is actuable by a toothed ratchet 904 comprising an arm 906 rotatably connected to a catch 908 at a first end 910 and engagingly received on a second toothed wheel 912 at a second end 914. The arm 906 is connected at a distal end to the second toothed wheel 912. When the arm 906 is depressed is causes the second toothed wheel 912 to rotate. The teeth on the wheels 902,912 are matingly engaged. Thus, rotation of the second wheel 912 causes the first wheel 902 to rotate, which in turn urges the strap 104 downward into the track 126. The pump-buckle 800 thus aids in the securement of wheels to the anchor and effectively adds an adjustable securement position for the strap over the first and second catch-traps discussed herein.

The various embodiments described above are provided by way of illustration only and should not be construed to limit the scope of the disclosure. Various modifications and changes can be made to the principles and embodiments described herein without departing from the scope of the disclosure and without departing from the claims which follow.

The invention claimed is:

1. A bicycle wheel anchor for securing differently sized bicycle wheels on a load carrier, the bicycle wheel anchor comprising:
    a bicycle wheel receiver configured to accept bicycle wheels of different sizes;
    an elongate wheel securement strap having a tongue portion, configured to be secured in a releasable strap fastener, and spaced apart from a tail portion that is located on an opposite side of an intermediate extension portion of the strap, the tail portion comprising a catch configured to be anchored at different locations on the bicycle wheel anchor in a plurality of variously located catch-traps on the bicycle wheel anchor; and
    a first catch-trap positioned a distance away from a second catch-trap so that a different length of the strap is available for extension about the wheel receiver in a first installed configuration of the strap in which the catch of the tail portion of the strap is anchored in the first catch-trap while the tongue portion is secured in the releasable strap fastener than in a second installed configuration of the strap in which the catch of the tail portion of the strap is anchored in the second catch-trap while the tongue portion is secured in the releasable strap fastener,
    wherein at least one of the first or second catch-traps is located on a lower portion of the wheel anchor and both the first and second catch-traps are located on the wheel anchor at a position lower than the bicycle wheel receiver.

2. The bicycle wheel anchor of claim 1, wherein the second catch-trap is located closer to the wheel receiver than the first catch-trap.

3. The bicycle wheel anchor of claim 1, wherein a greater length of the strap is available for extension about the wheel receiver in the first installed configuration of the strap than in the second configuration of the strap.

4. The bicycle wheel anchor of claim 1, further comprising:
    an elongate track circumscribing at least a portion of the bicycle wheel anchor, received within the track is at least a portion of the securement strap in at least one of the first and second installed configurations of the strap.

5. The bicycle wheel anchor of claim 4, wherein the track comprises an elongate recess into the bicycle wheel anchor.

6. The bicycle wheel anchor of claim 4, wherein the track positions the securement strap about the anchor in at least one of the first and second installed configurations of the strap.

7. The bicycle wheel anchor of claim 4, wherein the first and second catch-traps are positioned at different locations along a length of the track.

8. The bicycle wheel anchor of claim 4, wherein the track is enclosed along a portion thereof forming a tunnel within the bicycle wheel anchor that contains a portion of the strap in at least one of the first and second installed configurations of the strap.

9. The bicycle wheel anchor of claim 1, wherein the releasable strap fastener is located adjacent to the bicycle wheel receiver.

10. The bicycle wheel anchor of claim 9, wherein the strap fastener comprises a buckle.

11. The bicycle wheel anchor of claim 9, wherein the strap fastener comprises a lever and the strap comprises a series of projections, and wherein the lever is actuable to engage different ones of the projections for fixing the strap at different positions relative to the fastener.

12. A bicycle wheel anchor for securing differently sized bicycle wheels on a load carrier, the bicycle wheel anchor comprising:
   a bicycle wheel receiver configured to accept bicycle wheels of different sizes;
   an elongate wheel securement strap having a tongue portion, configured to be secured in a releasable strap fastener, and spaced apart from a tail portion that is located on an opposite side of an intermediate extension portion of the strap, the tail portion comprising a catch configured to be anchored at different locations on the bicycle wheel anchor in a plurality of variously located catch-traps on the bicycle wheel anchor; and
   a first catch-trap positioned a distance away from a second catch-trap so that a different length of the strap is available for extension about the wheel receiver in a first installed configuration of the strap in which the catch of the tail portion of the strap is anchored in the first catch-trap while the tongue portion is secured in the releasable strap fastener than in a second installed configuration of the strap in which the catch of the tail portion of the strap is anchored in the second catch-trap while the tongue portion is secured in the releasable strap fastener;
   wherein at least one of the first or second catch-traps is located on a lower portion of the wheel anchor; and
   a rail aperture through the lower portion of the wheel anchor is configured to receive a support rail of a bicycle carrier.

13. The bicycle wheel anchor of claim 12, wherein a portion of the securement strap is positioned beneath the rail aperture in the second installed configuration of the strap.

14. The bicycle wheel anchor of claim 12, wherein the second catch-trap is located lower on the anchor body than the rail aperture.

15. The bicycle wheel anchor of claim 12, further comprising:
   an elongate track circumscribing at least a portion of the bicycle wheel anchor, received within the track is at least a portion of the securement strap in at least one of the first and second installed configurations of the strap, wherein at least a portion of the track is positioned lower than the rail aperture.

16. The bicycle wheel anchor of claim 15, wherein at least a portion of the track is positioned beneath the rail aperture.

17. A bicycle wheel anchor for securing differently sized bicycle wheels on a load carrier, the bicycle wheel anchor comprising:
   a bicycle wheel receiver configured to accept bicycle wheels of different sizes;
   an elongate wheel securement strap having a tongue portion, configured to be secured in a releasable strap fastener, spaced apart from a tail portion that is located on an opposite side of an intermediate extension portion of the strap;
   an elongate track circumscribing at least a portion of the bicycle wheel anchor, the track receiving therein at least a portion of the securement strap; and
   a buckle that retracts the strap relative to the bicycle wheel receiver into the elongate track so that a different length of the strap is available for extension about the bicycle wheel receiver in a first secured configuration of the strap in which the tail portion of the strap is anchored in the elongate track at a first location along a length of the elongate track while the tongue portion is secured in the releasable strap fastener than in a second secured configuration of the strap in which the tail portion of the strap is anchored in the elongate track at a second location along a length of the elongate track while the tongue portion is secured in the releasable strap fastener.

18. The bicycle wheel anchor of claim 17, wherein the strap comprises a series of engagement locations along the length of the strap and the buckle includes a rotatable toothed wheel for serially engaging the engagement locations upon actuation of the buckle and thereby retracting the strap into the elongate track.

19. The bicycle wheel anchor of claim 17, wherein the track is enclosed along a portion thereof forming a tunnel within the bicycle wheel anchor that contains a portion of the strap in at least one of the first and second installed configurations of the strap.

20. A bicycle wheel anchor for securing differently sized bicycle wheels on a load carrier, the bicycle wheel anchor comprising:
   a bicycle wheel receiver configured to accept bicycle wheels of different sizes;
   an elongate wheel securement strap having a tongue portion, configured to be secured in a releasable strap fastener, and spaced apart from a tail portion that is located on an opposite side of an intermediate extension portion of the strap, the tail portion comprising a catch configured to be anchored at different locations on the bicycle wheel anchor in a plurality of variously located catch-traps on the bicycle wheel anchor;
   an elongate track circumscribing at least a portion of the bicycle wheel anchor, the track receiving therein at least a portion of the securement strap; and
   a first catch-trap positioned a distance away from a second catch-trap so that a different length of the strap is available for extension about the wheel receiver in a first installed configuration of the strap in which the catch of the tail portion of the strap is disposed in the elongate track and anchored in the first catch-trap while the tongue portion is secured in the releasable strap fastener than in a second installed configuration of the strap in which the catch of the tail portion of the strap is disposed in the elongate track and anchored in the second catch-trap while the tongue portion is secured in the releasable strap fastener.

* * * * *